(12) United States Patent
Struyven et al.

(10) Patent No.: US 7,086,201 B2
(45) Date of Patent: Aug. 8, 2006

(54) DOOR AND/OR WINDOW FRAME

(75) Inventors: Joseph Louis Philip Marie Ghislain Struyven, Brussels (BE); Heinz-Peter Backes, Wegberg (DE)

(73) Assignee: GenCorp Property, Inc., Sacramento, CA (US)

( * ) Notice: Subject to any disclaimer, the term of this patent is extended or adjusted under 35 U.S.C. 154(b) by 7 days.

(21) Appl. No.: 10/333,156

(22) PCT Filed: Jul. 19, 2001

(86) PCT No.: PCT/BE01/00120

§ 371 (c)(1),
(2), (4) Date: Apr. 28, 2003

(87) PCT Pub. No.: WO02/06070

PCT Pub. Date: Jan. 24, 2002

(65) Prior Publication Data

US 2003/0168814 A1    Sep. 11, 2003

(30) Foreign Application Priority Data

Jul. 19, 2000    (BE) .................................. 2000/0460

(51) Int. Cl.
*B60J 5/04* (2006.01)
*E06B 7/16* (2006.01)

(52) U.S. Cl. ........................ 49/502; 49/492.1; 49/490.1

(58) Field of Classification Search ................ 49/492.1, 49/490.1, 489.1, 495.1, 441, 440, 475.1, 49/502; 296/146.9, 146.16, 146.15, 146.1; 52/204.51; 428/122; 277/921

See application file for complete search history.

(56) References Cited

U.S. PATENT DOCUMENTS

| | | | | |
|---|---|---|---|---|
| 4,656,784 A | * | 4/1987 | Brachmann | 49/490.1 |
| 5,125,716 A | | 6/1992 | Kiefer et al. | |
| 5,209,019 A | * | 5/1993 | Morita | 49/490.1 |
| 5,219,382 A | * | 6/1993 | Backes | 49/440 |
| 5,347,758 A | * | 9/1994 | Yamane | 49/484.1 |
| 5,352,009 A | * | 10/1994 | Takeuchi | 296/146.9 |
| 6,237,287 B1 | | 5/2001 | Nakagawa et al. | |
| 6,260,906 B1 | * | 7/2001 | Buchholz | 296/146.9 |
| 6,435,597 B1 | * | 8/2002 | Anders et al. | 49/490.1 |
| 6,598,348 B1 | * | 7/2003 | Palicki | 49/479.1 |
| 6,601,345 B1 | * | 8/2003 | Nozaki et al. | 49/483.1 |
| 6,641,204 B1 | * | 11/2003 | Ogawa et al. | 296/146.9 |

FOREIGN PATENT DOCUMENTS

| | | |
|---|---|---|
| DE | 195 31 600 A1 | 8/1995 |
| DE | 197 30 942 | 1/1998 |
| EP | 0 163 991 A | 12/1985 |

(Continued)

*Primary Examiner*—Hugh B. Thompson, II
(74) *Attorney, Agent, or Firm*—Leydig, Voit & Mayer, Ltd.

(57) ABSTRACT

Frame for a door and/or window, particularly for a transport vehicle, comprising a seal support, and a seal which seals between at least part of a peripheral edge of the door and/or window and the seal support when the door and/or window is or are in the closed position, and which is in the form of an injection-molded element of elastic nature, characterized in that it further comprises an intermediate element which is equipped with the seal molded onto it and which has the first fixing means, and in that the seal support and second fixing means capable of collaborating with the said first fixing means to fix the intermediate element, equipped with the seal molded onto it, to the seal support.

24 Claims, 6 Drawing Sheets

FOREIGN PATENT DOCUMENTS

| | | |
|---|---|---|
| EP | 0 317 988 A | 5/1989 |
| EP | 0 420 617 | 4/1991 |
| EP | 0 512 673 | 11/1992 |
| EP | 0 614 776 A | 9/1994 |
| EP | 0 625 446 A | 11/1994 |
| EP | 0 729 865 A | 9/1996 |
| GB | 2 272 469 A | 5/1994 |

* cited by examiner

DOOR AND/OR WINDOW FRAME

This application is a 371 of PCT/BE01/00120, filed Jul. 19, 2001.

FIELD OF THE INVENTION

The present invention relates to a frame for a door and/or window, particularly for a transport vehicle, comprising
- a seal support, and
- a seal which seals between at least part of a peripheral edge of the door and/or window and the seal support when the door and/or window is or are in the closed position, and which is in the form of a moulded element of elastic nature.

BACKGROUND OF THE INVENTION

In transport vehicles, and in particular in automobiles, systems for sealing and going round doors and windows, particularly windows that can be moved between an open position and a closed position, have long been known. The window frame consists in general of one or more elements which act as support for a seal and which usually form a surround in the shape of an inverted U supported by a door of the vehicle. A seal made of an elastic material with a metal core which is extruded in the form of a section piece is usually applied to this support. This section piece cannot be applied as one piece to the web and the arms of the U shape of the support. Transitions, which are not sealed by bits of section piece applied to the web and to the arms of the U therefore lie at the corners of the support. At that location, these transitions need to be sealed through an expensive additional operation, by introducing, in particular, a rubbery material at that point and vulcanizing it there. To fix extruded section piece seals it is necessary to provide complex grooves in the support, in which grooves corresponding elastic ribs of the seals can be housed, by pressing by hand.

This way of fixing is a slow operation which is therefore costly in terms of labour.

The method of moulding rubber seals onto the frame of an automobile window is also known (see GB-A-2272469).

That method has the disadvantage that moulding followed by a vulcanizing has to be preformed on the production line along which the door frame passes. Furthermore, if the seal becomes damaged or worn, even very partially or very locally, it is necessary to replace the entire door if the defective point is to be repaired.

OBJECTS AND SUMMARY OF THE INVENTION

It is an object of the present invention to develop a door and/or window frame which is extremely simple and well sealed, which makes it possible to avoid the aforementioned drawbacks, and an economical method for manufacturing such a frame.

This problem is solved according to the invention by a door and/or window frame as described at the beginning, this frame being characterized in that it further comprises an intermediate element which is equipped with the seal moulded onto it and which has first fixing means, and in that the seal support and second fixing means capable of collaborating with the said first fixing means to fix the intermediate element, equipped with the seal moulded onto it, to the seal support. A frame such as this offers the advantage that the seal can easily be fixed to the seal support via a rigid element. Fixing together the support which is itself rigid and the intermediate element can be achieved by any appropriate means, for example by clipping them together. Such a solution is particularly appropriate because it allows the seal to be exchanged following wear or partial destruction, while at the same time avoiding the painstaking pushing of rubbery ribs into narrow grooves.

In such a frame, the seal receives its final shape in a single operation and the subsequent sealing of the corners of the support disappears. The seal is immediately fixed to an insert which is rigid per se, namely the intermediate element, and no longer has itself to be manipulated thereafter. The problems associated with the tolerances between the extruded section piece according to the prior art and the seal support, have disappeared.

The seal part can be completely recycled in a simple way because it is made of one single material, for example advantageously a thermoplastic elastomer (TPE) or a thermoplastic olefin (TPO), which are materials that can very easily be injection-moulded, and which do not require subsequent vulcanization.

According to one advantageous embodiment of the invention, the seal comprises an additional part which is fixed to the intermediate element without being moulded onto it.

Other forms of embodiment of a door and/or window frame according to the invention are indicated in claims 1 to 9.

The invention also relates to a seal for the frame of a door and/or window, which is in the form of an element of elastic nature injection-moulded onto an intermediate element by way of a rigid insert, the intermediate element having first fixing means capable of collaborating with second fixing means of a door and/or window frame seal support. It is actually possible to envisage standardizing the frame with the said second fixing means and manufacturing and marketing just the seal, moulded onto its insert, in the form of a component part. This may advantageously be manufactured away from the assembly line, and fixing the seal onto the support on the assembly line takes just a few seconds, for example clipping them together.

According to another form of embodiment of the seal according to the invention, the seal further comprises an additional part which is fixed to the intermediate element without being moulded onto it.

The invention also relates to a method for manufacturing a door and/or window frame, particularly for a transport vehicle, comprising
  shaping of a seal support into a shape that corresponds to at least part of a peripheral edge of the door and/or of the window, and
  moulding a seal, by injecting an appropriate material that can be moulded over a rigid insert arranged in a mould.

This method according to the invention is characterized in that it involves introducing an intermediate element into the mould by way of a rigid insert, which intermediate element has first fixing means, shaping the seal support in such a way as to provide it with second fixing means capable of collaborating with the first fixing means, and fixing the moulded seal onto the seal support by collaboration between the said first fixing means and the said second fixing means so that the seal provides sealing between the said at least one part of the peripheral edge of the door and/or of the window and the seal support when the door and/or the window is or are in the closed position.

According to another method of embodiment of the invention, the method involves introducing into the mould, by way of a rigid insert, the intermediate element equipped with an additional seal part not moulded onto it, and moulding the seal over this intermediate element thus provided. It is thus possible for an additional part, for example made of rubber, to be fixed temporarily and loosely onto the rigid insert, and to obtain, after moulding, an intermediate element onto which this additional part is firmly fixed.

Other details and specifics of the invention will become apparent from the description given hereinafter without implied limitation and with reference to the appended drawings.

Furthermore, the invention relates to a frame arrangement for a door and/or window, particularly for a transport vehicle, comprising a seal support, and seal means which seals between at least part of a peripheral edge of the door and/or window and the seal support when the door and/or window is or are in the closed position, and which is at least partly in the form of a moulded element of elastic nature, characterised in that it further comprises an intermediate element, in that the said part of the seal means comprises a first seal which is mounted on the intermediate element by being moulded thereon, in that the seal means also comprises a second seal which is separate from the first seal and is also mounted on the intermediate element, by fixing means for fixing the intermediate element, with the first and second seals mounted on it, to the seal support, and in that one of the first and second seals is made of thermoplastic elastomer material.

In the various drawings, elements which are identical or similar are denoted by the same references.

DESCRIPTION OF THE PREFERRED EMBODIMENTS

Figure 1:
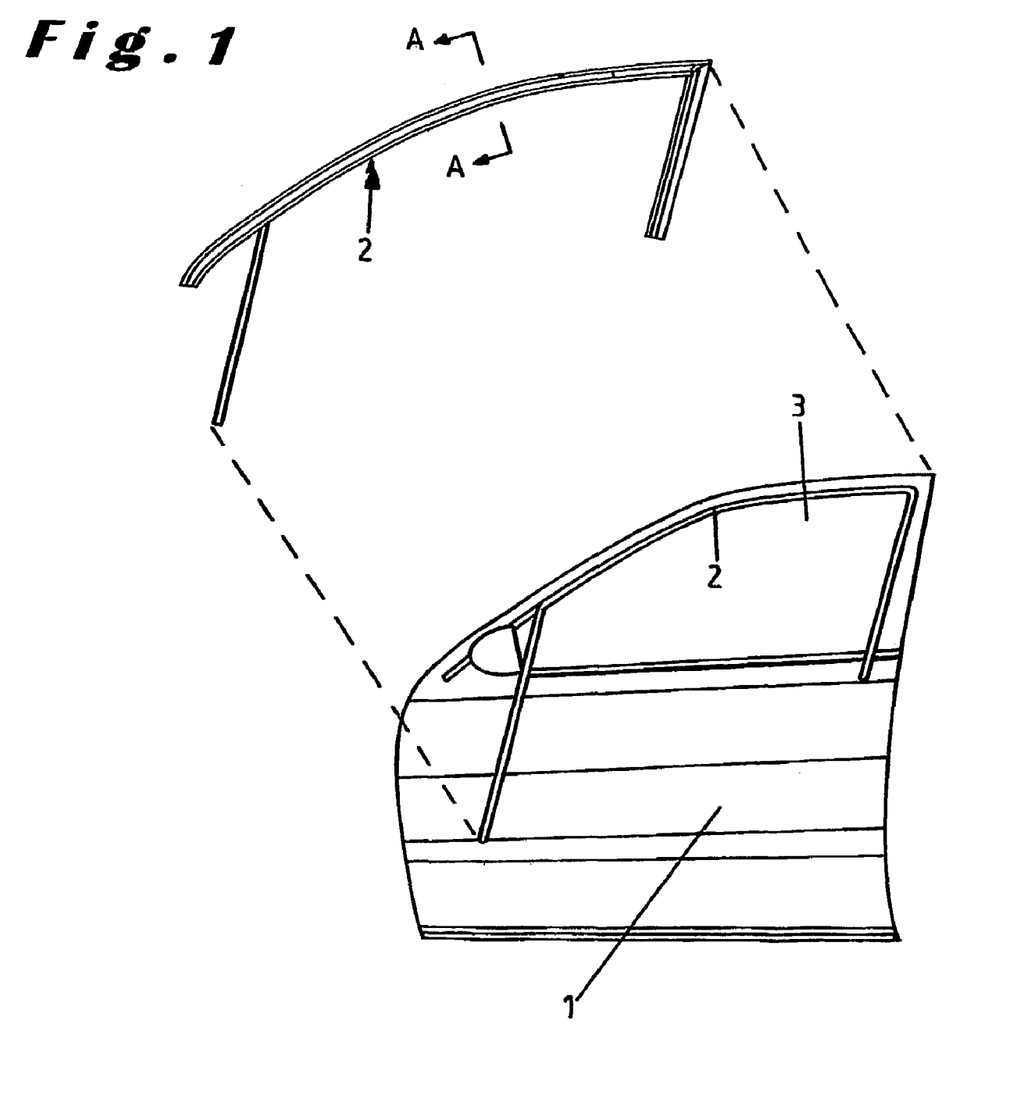
FIG. 1 depicts a side view of a car door with, in an exploded position, a seal support.

FIG. 1 depicts a conventional automobile door 1 and the frame 2 of the window 3 has been extracted from the door. This frame is to surround the window in a sealed manner when this window is in the closed position.

The description which follows relates to an automobile window frame. It must be understood that window frames of other vehicles, such as lorries, aeroplanes, boats, caravans, wagons and the like, and even fixed constructions or containers in which a sliding window is to be sealed in the closed position are included within the scope of the present invention. The same is true of door frames for doors with or without windows.

The frame 2 according to the invention comprises a steel support 4 which is preferably, but not necessarily, formed of a section piece 5 in one piece made of a rigid material, such as a hard synthetic material, steel, aluminium or magnesium, for example. The section piece 5 is preferably hollow in order to save weight.

To shape the section piece 5 in such a way that it has the appearance of an inverted U, as illustrated in FIG. 1, it is possible to envisage all appropriate means known to those skilled in the art, whether this be by assembling components, bending, deformation, for example by hydroforming.

Figure 2:
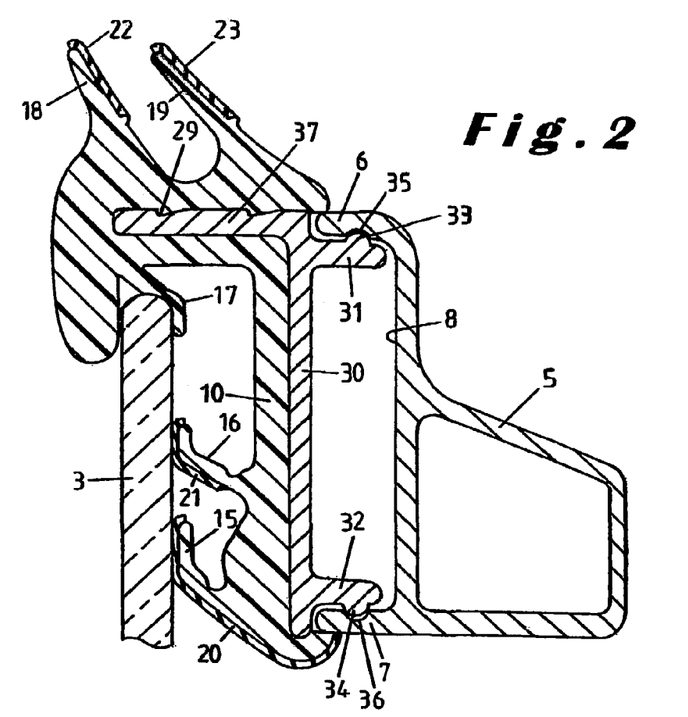
FIGS. 2–7 depict views in section on A—A in FIG. 1 of various forms of embodiment of frames according to the invention.

In the exemplary embodiment depicted in FIG. 2, the section piece 5 has projecting legs 6 and 7 which are bent in such a way as to form a groove 8 between them.

In that exemplary embodiment, the seal 10 is made of a material of an elastic nature, it being possible for that material to be injection-moulded. For this purpose, provision may be made of TPO or TPE, for example.

In particular, it has a series of sealing lips 15 to 19.

These are advantageously coated with a sealing strip 20 to 23, for example made of synthetic foam or lacquer. When the window 3 is in the closed position, some of these lips press against the window pane which is thus sealed.

FIG. 2 illustrates an alternative form of embodiment of a frame according to the invention, in which the seal 10 is made of one piece. It has been injection-moulded over an insert formed of an intermediate fraction piece 30 made of hard material, for example metal or plastic. This section piece 30 has two legs 31 and 32 projecting away from the seal 10. The legs 31 and 32 of the intermediate section piece can be slipped elastically into the groove formed by the two legs 6 and 7 of the section piece 5. The legs 31 and 32 are equipped with clip-fastening means 33 and 34 which are common in themselves and capable of collaborating with corresponding clip-fastening means 35 and 36 borne by the legs 6 and 7 of the section piece 5. In this exemplary embodiment, the intermediate section piece 30 also has a direction away from the legs 31 and 32, an additional leg 37 which is covered with channels 29. The intermediate section piece 30 is introduced by way of an insert into a mould, not depicted, and the material of elastic nature is then injection-moulded directly onto it, in a common way, entering the gaps of the mould and, in particular, filling the channel 29. Thereafter, the section piece 30 equipped with the seal 10 can easily be slipped and clip-fastened onto the seal support 5. This form of embodiment therefore allows very easy placement and replacement of the seal.

Figure 3:
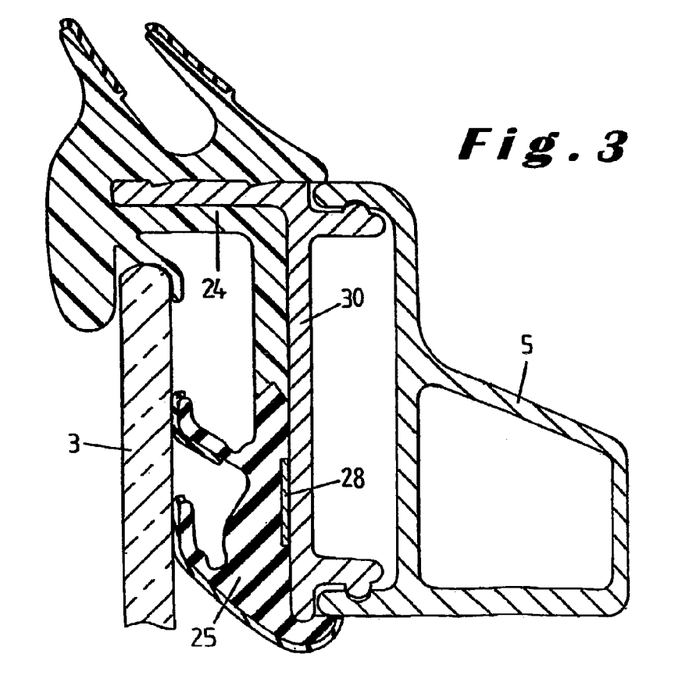

FIG. 3 illustrates a form of embodiment of a frame which is comparable with that of FIG. 2, except that the seal is formed of two parts, a part 24 which is injection-moulded and an additional part 25 which is not injection-moulded. The additional part 25 may be made of an extruded material, for example a natural or synthetic rubber, of TPO or of TPE. This extruded part does not need to be co-extruded with a metal core and can therefore easily be fixed to the intermediate section piece 30 via means of mutual attachment, such as a strip of double-sided sticky tape 28, for example. It is also possible simultaneously or alternatively to envisage other means of attachment, for example one or more corresponding channels and ribs. In this exemplary embodiment, the additional part 25 which is not injection-moulded is introduced into the mould, in the state fixed to the intermediate section piece 30. The part 24 of the seal is then injection-moulded over this assembly, to adopt the desired shape, and at the same time to definitively fix the additional part 25 onto the intermediate section piece 30.

Figure 4:
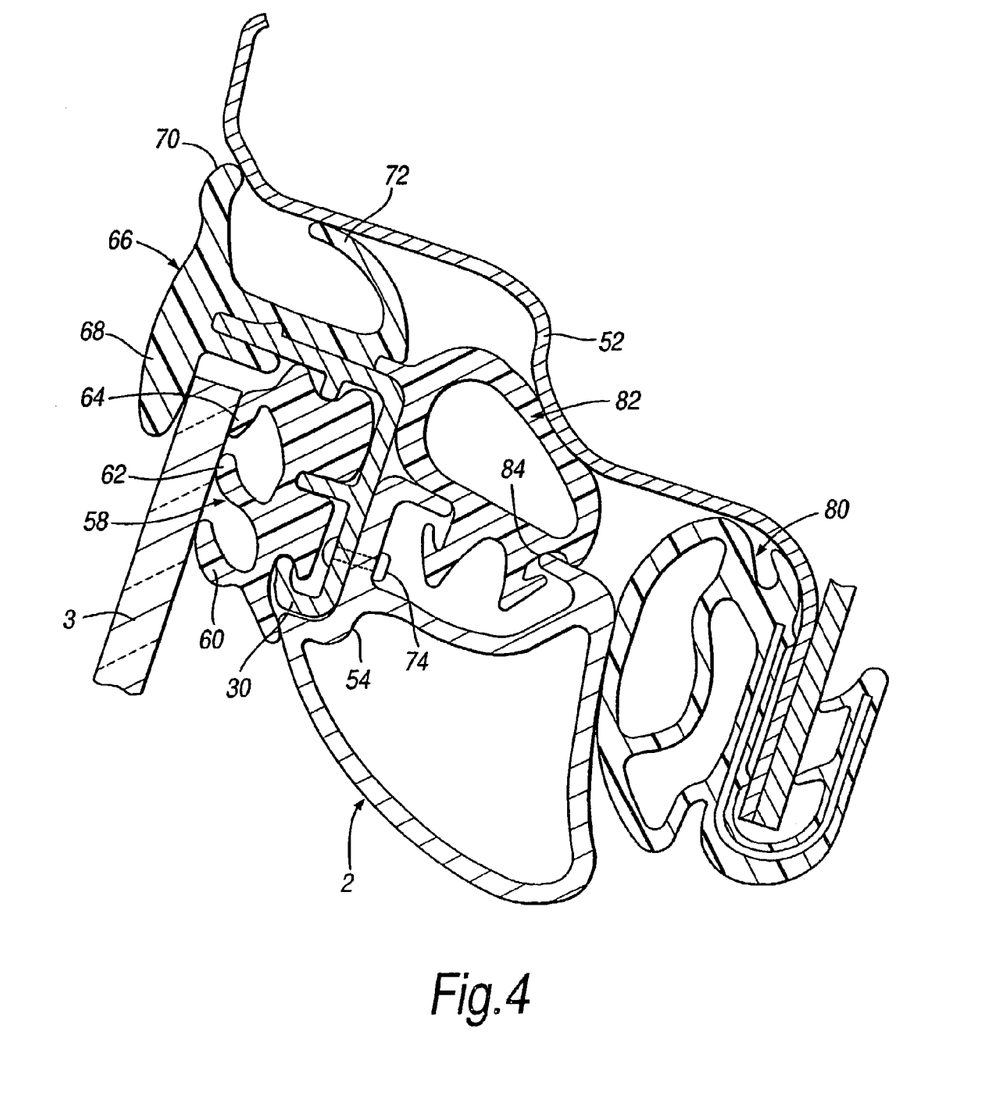

FIG. 4 shows part of the frame 52 of the opening in the vehicle body for the door 1. Also shown in FIG. 4 is the upper part of the window frame 2 carried by the door 1 which is shown in FIG. 4 in the form of a seal support 54 and would be made of metal or similar rigid material.

As shown in FIG. 4, the intermediate element 30 carries a first seal 58 which may be made of rubber (EPDM) or from thermoplastic elastomer (TPE). This first seal 58 is, in this example, provided with three extending and flexible lips (60, 62 and 64).

In addition, the intermediate element 56 carries a second seal 66 which is preferably made of TPE. The second seal 66 has a downwardly extending lip part 68 and upwardly extending lip parts 70, 72.

Preferably, at least one of the two seals 58, 66 is made of TPE.

The first and second seals 58, 66 are assembled onto the intermediate element 30 before the latter element is mounted on the seal support 54. The intermediate element 30, carrying the first and second seals 58, 66 is then mounted in position on the seal support 54 as a unit and may be secured in position by any suitable means such as clips of which one is shown, in diagrammatic form only, at 74.

When the intermediate element 30, carrying the seals 58 and 66, is mounted in position on the seal support 54, as shown in FIG. 4, the first and second seals 58, 66 together define a channel for receiving the upper edge of the window pane 3. The lip part 68 of the second seal 66 bears against the outside of the window pane 3, and the lips 60, 62 and 64 bear against its inside surface. The portions of the lip part 68 and of the lips 60, 62 and 64, which contact the window pane can be covered with flock or similar material (not shown) for providing a low friction surface against the window glass.

The lip parts 70, 72 of the second seal 66 provide a sealing action against the door frame 52.

At least one of the first and second seals 58, 66 is mounted on the intermediate element 30 by means of a moulding action such as an injection-moulding action. If the first and second seals 58, 66 are both made of TPE, they may be mounted on the intermediate element 30 by a single moulding action. If the first seal 58 is made of EPDM and the second seal 66 is made of TPE, two separate moulding operations may be used, although it is still possible in such a case to use a single moulding operation (but with the appropriate injection of the EPDM and TPE materials).

As shown in FIG. 4, the door frame 52 carries a sealing strip 80 which is partially compressed by the seal support 54 of the window frame 2 in the closed position (as shown in FIG. 4) of the door 1, and provides a weatherproof seal.

Further sealing action between the window frame 2 and the door frame 52 is provided by a further sealing strip 82 which is clipped in position by being inserted in an aperture 84 forming part of the seal support 54.

Figure 5:
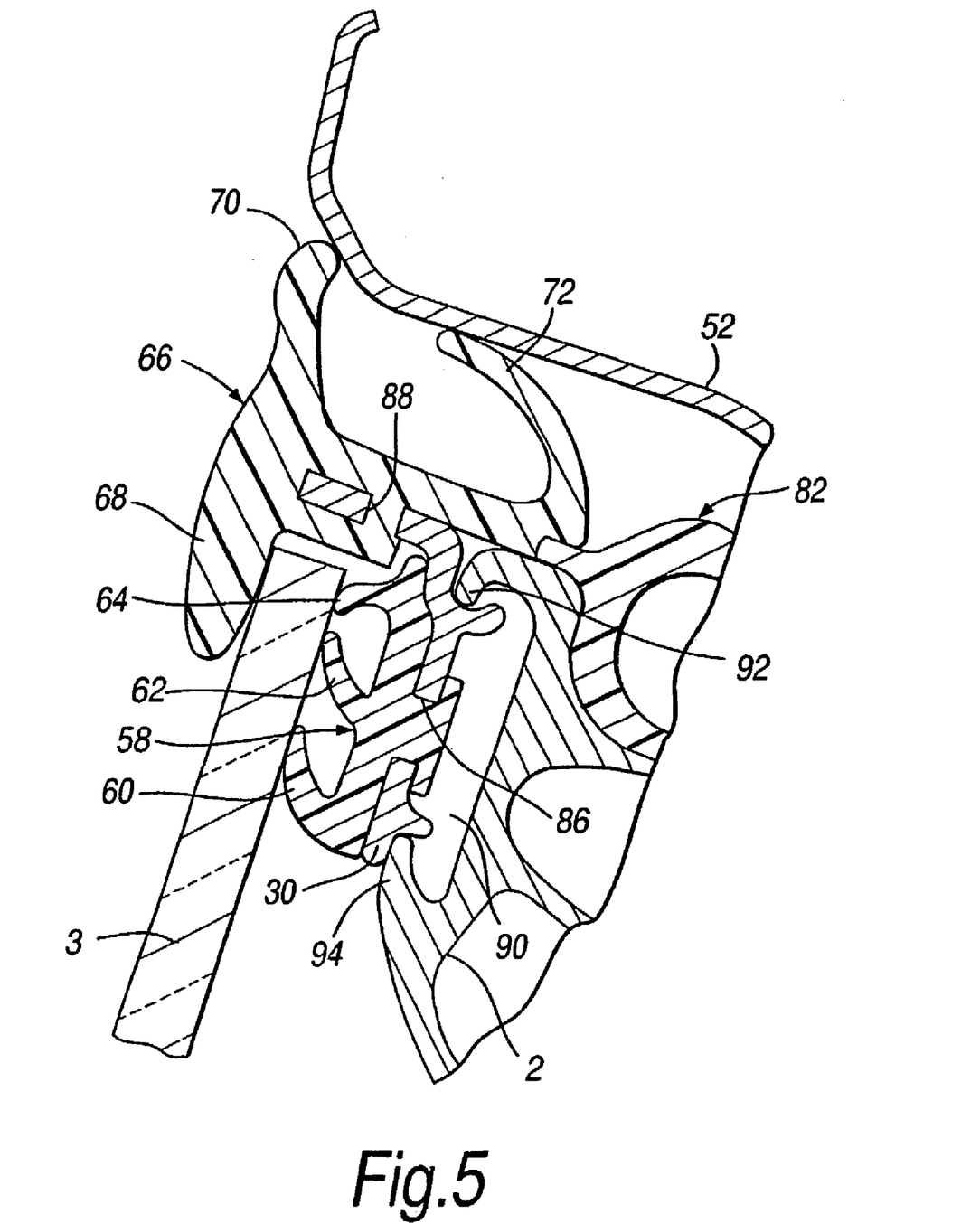

FIG. 5 shows a modification to the arrangement of FIG. 4. In FIG. 5, only part of the arrangement of FIG. 4 is shown. In FIG. 5, the intermediate element 30 is formed with two series of holes 86, 88. The material of the seals 58, 66 flows through these holes during the moulding process so that the seals 58, 66 are more securely held on the intermediate element 30.

In addition, FIG. 5 shows a modified shape for the seal support 54 which defines a recess 90 having re-entrant edge portions 92, 94 which engage recesses in the intermediate element 30 to hold it in position.

Figure 6:
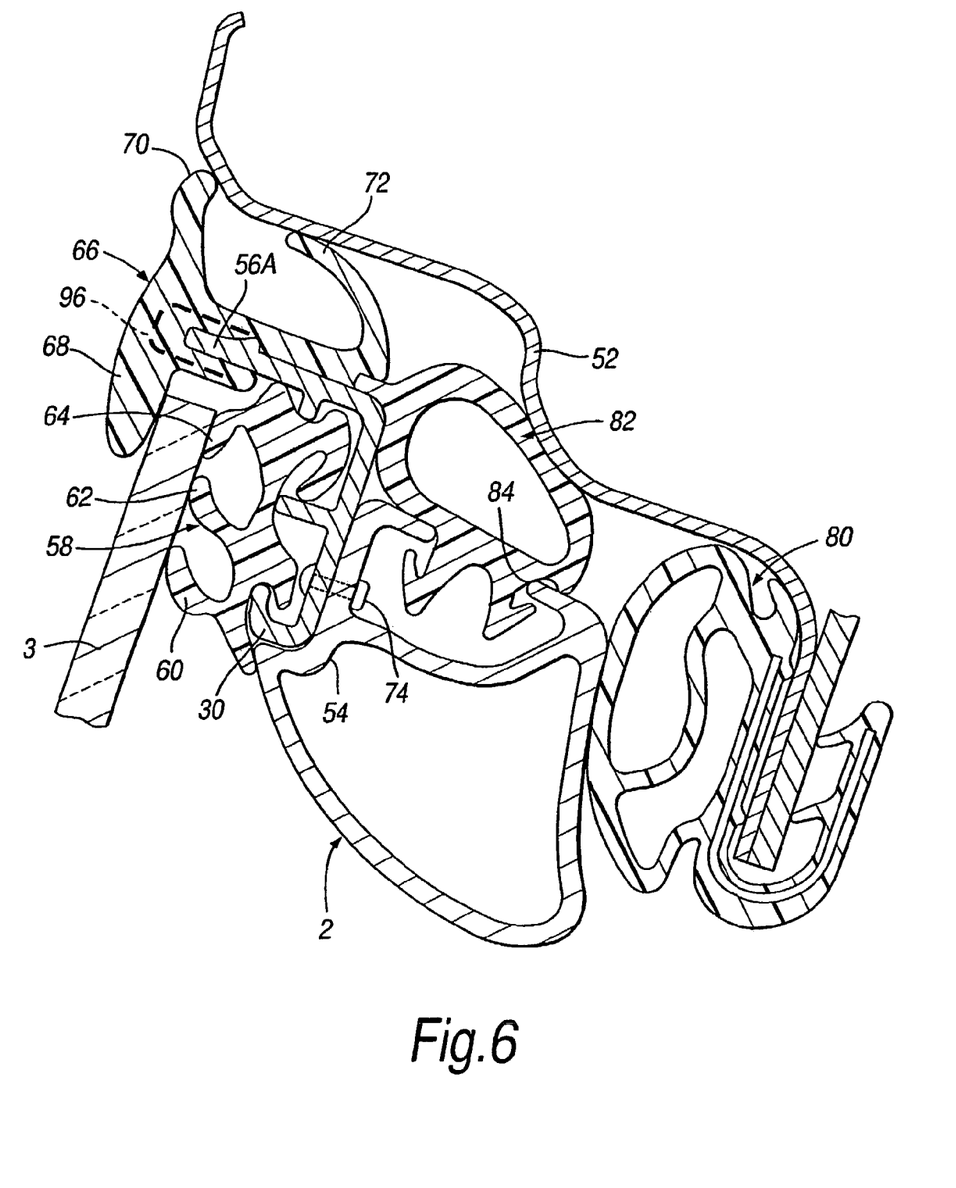

In another embodiment shown in FIG. 6, at least one of the first and second seals 58, 60 is mounted on the intermediate element 30 by means other than moulding. As shown in FIG. 6, the first seal 58 is clipped in position on the intermediate element 30, and the second seal 66 embracingly grips a flange 56A of the intermediate element 30. The material of the second seal 66 where it embracingly grips the flange 56A may be reinforced by an embedded resilient carrier 96 (shown dotted), such as made of metal.

Although FIG. 6 shows both the first and second seals 58, 66 mounted in position other than by a moulding method, it will be understood that one of them could be mounted on the intermediate element 30 by a moulding operation and the other by a non-moulding operation such as shown in FIG. 6. When such a seal is mounted on the intermediate element 30 other than by a moulding operation, it may be produced by means of an extrusion process.

Figure 7:
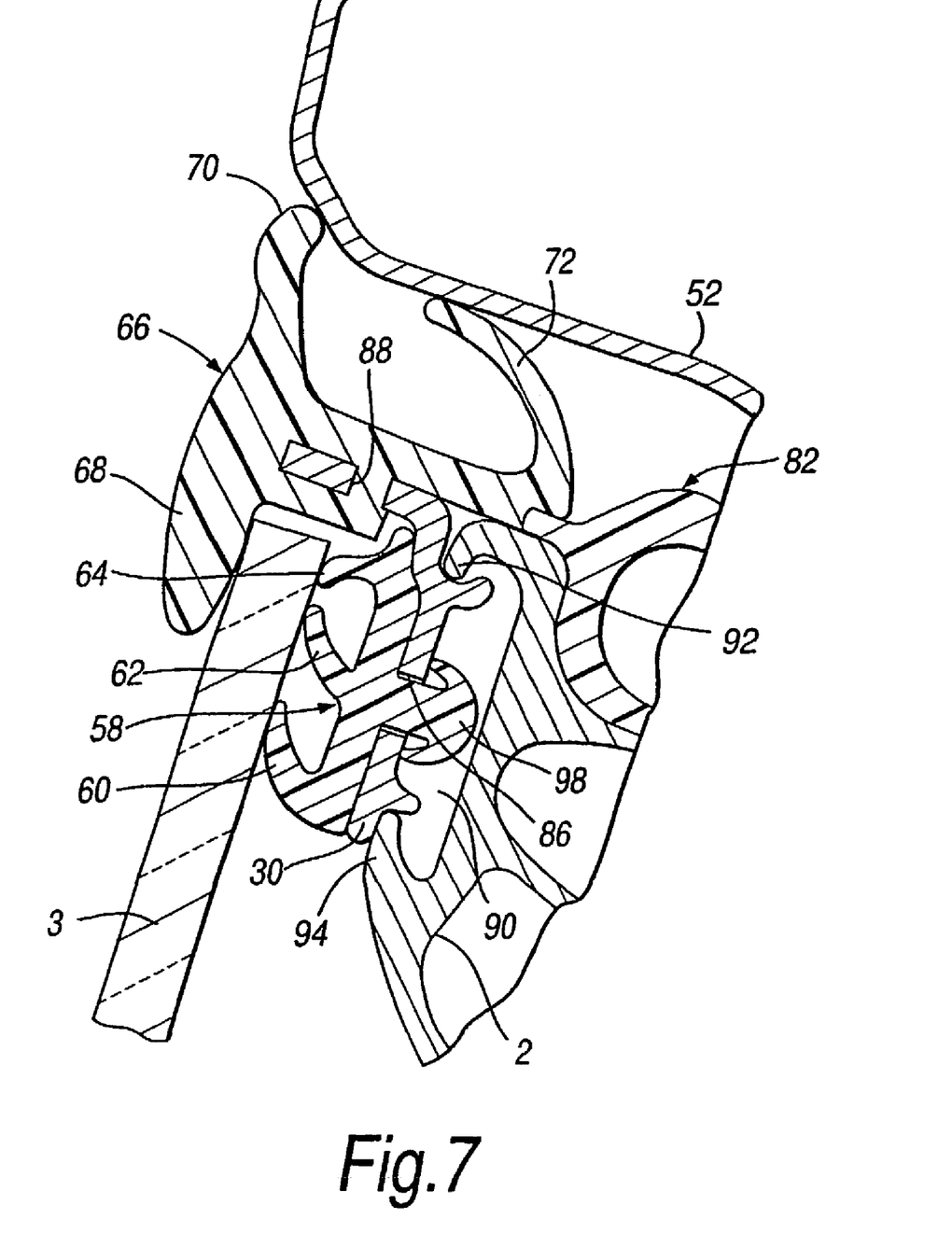

FIG. 7 shows a modification to the arrangement of FIG. 6. In FIG. 7, only part of the arrangement of FIG. 6 is shown. As in FIG. 5, the intermediate element 30 of FIG. 7 is formed with the holes 86, 88. In FIG. 7, it is assumed that the seal 66 is moulded onto the intermediate element 30 (as in FIG. 5). However, the seal 58 is not moulded but is separately formed, preferably by extrusion, and then mounted on the intermediate element 30 by forcing part of the extruded material of the seal through the holes 86 as shown at 98. The material forced through the holes 86 is shaped to provide enlarged head portions to hold the seal 58 in position. In order to produce the head portions 98, it may be necessary to carry out a cutting operation on the seal 58 after the extrusion process.

The intermediate element 30 is mounted on the seal support 54 in the same way as in FIG. 5.

It is to be clearly understood that the present invention is not in any way restricted to the forms of embodiment described hereinabove and that many modifications can be made thereto without departing from the scope of the attached claims.

The invention claimed is:

1. A frame for at least one of a door and a window of a transport vehicle, at least one of the door and the window being movable between an open position and a closed position, the frame comprising
   a seal support,
   a seal which seals between at least part of a peripheral edge of said at least one of the door and window and the seal support when said at least one of the door and window is or are in the closed position, and which is in the form of a molded element of elastic nature, the seal comprising an additional part,
   an intermediate element which is equipped with the seal molded onto it and which has first fixing means, the additional part being fixed to the intermediate element without being molded onto it, and
   the seal support having second fixing means adapted to cooperate with said first fixing means to fix the intermediate element to the seal support.

2. The frame according to claim 1, wherein said first and second fixing means can be clipped together.

3. The frame according to claim 1, wherein the seal comprises at least one sealing lip which has a bearing surface that bears on the window in the closed position and which is elastically deformed.

4. The frame according to claim 3, wherein the bearing surface of said at least one sealing lip is covered with at least one of a sealing film, strip and coating.

5. The frame according to claim 1, wherein the seal is based on a supple and elastic material that can be injection-molded.

6. The frame according to claim 5, wherein the material that can be injection-molded is chosen from the group consisting of thermoplastic elastomers and thermoplastic olefins.

7. The frame according to claim 1, wherein the additional part is in the form of an extruded element made from a supple and elastic material that can be extruded.

8. The frame according to claim 7, wherein the material that can be extruded is chosen from the group consisting of thermoplastic elastomers, thermoplastic olefins and natural and synthetic rubbers.

9. The frame according to claim 1, wherein the intermediate element comprises a rigid insert.

10. A method for manufacturing at least one of a door frame for a door and a window frame for a window for a transport vehicle, the method comprising the steps of
shaping of a seal support into a shape that corresponds to at least part of a peripheral edge of said at least one of the door and the window,
introducing an intermediate element into a mold, the intermediate element comprising a rigid insert and a first fixing means, the intermediate element being equipped with an additional seal part not molded onto it, and
molding a seal over said intermediate element thus provided by injecting an appropriate material over the intermediate element arranged in the mold,
providing the seal support with second fixing means adapted to cooperate with the first fixing means by shaping the seal support, and
fixing the molded seal onto the seal support by cooperation between the said first fixing means and the said second fixing means so that the seal provides sealing between said at least one part of the peripheral edge of said at least one of the door and the window and the seal support when said at least one of the door and the window is or are in the closed position.

11. A seal for a frame of at least one of a door and a window comprising a door or window frame seal support having a fixing means, the seal comprising
an intermediate element, the intermediate element comprising element fixing means, said element fixing means being adapted to cooperate with at least one of the door and the window frame seal support fixing means,
an additional part, the additional part being fixed to the intermediate element without being molded onto the intermediate element, and
an elastic element, said elastic element being injection molded onto the intermediate element.

12. The seal according to claim 11, wherein the intermediate element comprises a rigid insert.

13. A frame arrangement for at least one of a door and window for a transport vehicle, at least one of the door and the window being movable between an open position and a closed position, the frame arrangement comprising a seal support,
seal means which seals between at least part of a peripheral edge of said at least one of the door and window and the seal support when said at least one of the door and window is or are in the closed position, and which is at least partly in the form of a molded element of elastic nature, and
an intermediate element,
said seal means comprising a first seal which is mounted on the intermediate element by being molded thereon,
the seal means also comprising a second seal which is separate from the first seal and is also mounted on the intermediate element by fixing means for fixing the intermediate element, with the first and second seals mounted on it, to the seal support, and wherein one of the first and second seals is made of thermoplastic elastomer material.

14. The frame arrangement according to claim 13, wherein the second seal is mounted on the intermediate element by being molded onto the intermediate element.

15. The frame arrangement according to claim 13, wherein the second seal is mounted on the intermediate element other than by being molded onto the intermediate element.

16. The frame arrangement according to claim 15, wherein the second seal is produced by extrusion.

17. The frame arrangement according to claim 13, wherein the other of the first and second seals is made from thermoplastic elastomer material.

18. The frame arrangement according to claim 13, wherein the other of the first and second seals is made from rubber.

19. The frame arrangement according to claim 18, wherein the other of the first and second seals is made from a rubber.

20. The frame arrangement according to claim 13, wherein the intermediate element is provided with one or more holes, apertures or recesses for receiving material of the seal means to secure the seal means on the intermediate element.

21. The frame arrangement according to claim 13, wherein the intermediate element is mounted on the seal support by clipping.

22. The frame arrangement according to claim 13, wherein the intermediate element comprises a rigid insert.

23. The frame arrangement according to claim 13, wherein the seal support is part of a window frame, and the first and second seals together define a channel for receiving an edge of a window pane for the window.

24. The frame arrangement according to claim 23, wherein the window frame is carried by a vehicle door, and in that one of the seals also provides a seal between the window frame and a frame for the door.

* * * * *